(12) United States Patent
Tournour et al.

(10) Patent No.: US 6,713,111 B1
(45) Date of Patent: Mar. 30, 2004

(54) METHOD OF PRODUCING FOOD PATTIES USING MULTIPLE ROW MOLDING APPARATUS

(75) Inventors: Robert Tournour, Plymouth, WI (US); Richard A. Payne, Plymouth, WI (US)

(73) Assignee: Tomahawk Manufacturing, Inc., Sheboygan, WI (US)

( * ) Notice: Subject to any disclaimer, the term of this patent is extended or adjusted under 35 U.S.C. 154(b) by 0 days.

(21) Appl. No.: 10/133,681

(22) Filed: Apr. 29, 2002

Related U.S. Application Data

(62) Division of application No. 09/967,153, filed on Sep. 28, 2001, now Pat. No. 6,604,935.

(51) Int. Cl.[7] .................................................. A23P 1/00
(52) U.S. Cl. ........................ 426/512; 425/441; 425/556; 425/572; 426/513
(58) Field of Search ................................ 426/512, 513; 425/556, 572, 441

(56) References Cited

U.S. PATENT DOCUMENTS 5,795,610 A * 8/1998 London ....................... 426/513
6,454,559 B1 * 9/2002 Lindee ........................ 425/572

* cited by examiner

Primary Examiner—G. Yeung
(74) Attorney, Agent, or Firm—Donald Cayen

(57) ABSTRACT

A method of operating a multiple row molding apparatus provides greatly increased production of food patty machines. The method comprises the steps of providing a mold plate having front and back cavities in longitudinal and transverse alignment. When the mold plate is at a retracted position, multiple fill slots enable flow of the food product from a manifold simultaneously to all the cavities. At an extended position, all the patties are ejected simultaneously by a knockout mechanism. The fill slots may be either one long fill slot, or multiple short fill slots in communication with respective cavities. In a modified method, food product flows through a single fill slot and communicates only with the front cavities when the mold plate is in its retracted position. As the mold plate advances toward its extended position, the row of back cavities passes over the fill slot and enables the food product to flow into the back cavities.

15 Claims, 11 Drawing Sheets

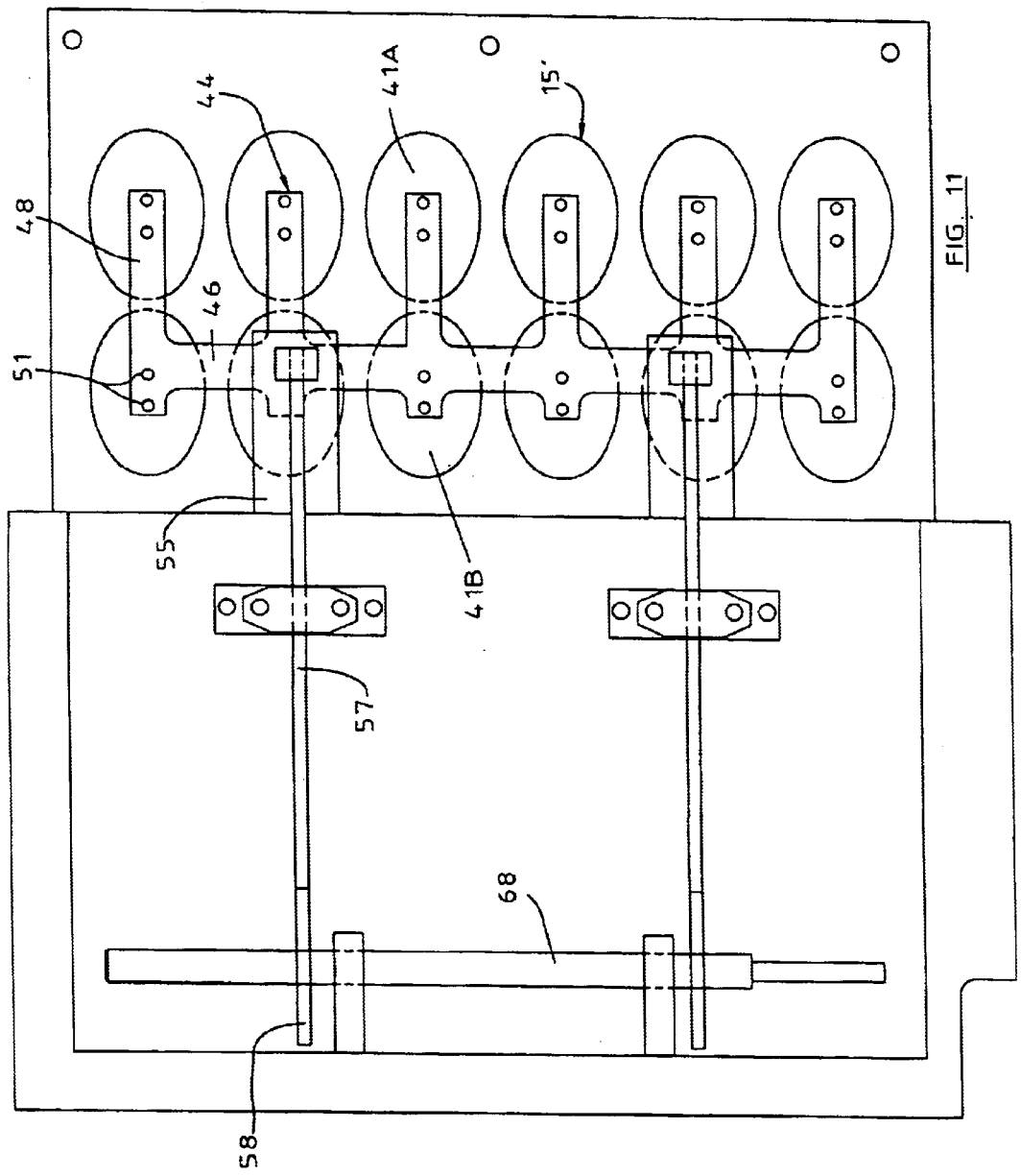

METHOD OF PRODUCING FOOD PATTIES USING MULTIPLE ROW MOLDING APPARATUS

This is a divisional of U.S. patent application Ser. No. 09/967,153 filed Sep. 28, 2001 now U.S. Pat. No. 6,604,935.

BACKGROUND OF THE INVENTION

1. Field of the Invention.

This invention pertains to food processing, and more particularly to apparatus that molds individual patties from a bulk quantity of a food product.

2. Description of the Prior Art.

Various equipment has been developed to make individual food patties on a high production basis. For example, it is well known to load a quantity of ground meat, such as beef or pork, into a hopper of a molding machine. The meat is forced from the hopper through a pump box and into a manifold. From the manifold, the ground meat flows through fill slots into multiple cavities in a mold plate. The mold plate with the filled cavities advances in a longitudinal direction to a knockout station, at which the meat is pushed out of the cavities. The mold plate then returns to a fill station for refilling the cavities. U.S. Pat. Nos. 3,486,186; 3,887,964; 3,952,478; 4,054,967; 4,097,961; 4,182,003; 4,334,339; 4,343,068; 4,356,595; 4,372,008; 4,535,505; 4,597,135; 4,608,731; 4,622,717; 4,697,308; 4,768,941; 4,780,931; 4,821,376; 4,996,743; 5,021,025; 5,022,888; 5,655,436; and 5,980,228 are representative of prior machinery for making round patties from bulk quantities of ground meat. U.S. Pat. No. 4,818,446 illustrates a machine for making generally rectangular patties.

In the machines of all the aforementioned patents, the mold plate cavities are arranged in a single row that is transverse to the directions of mold plate reciprocation. Thus, for each cycle a number of patties is produced that is equal to the number of cavities in the mold plate.

To increase the production rate of producing the patties, it was necessary that the prior mold plates reciprocate faster. However, there was a practical limit as to how fast the prior machines could operate. The limitations were based on the acceleration forces produced on the reciprocating components, and also on the ability of the meat product to flow from the manifold through the fill slots into the mold plate cavities. For most prior machines, the practical limit was approximately 90 cycles per minute. If that production rate was insufficient, it was necessary for the processing plant to acquire more machines.

U.S. Pat. No. 4,975,039 describes a food molding machine having a mold plate with two transverse rows of cavities. A knockout station is between two fill stations. While one row of the mold plate cavities is being filled at a first fill station, the second row is at the knockout station. The mold plate reciprocates to bring the first row to the knockout station and the second row to the second fill station. The machine of the U.S. Pat. No. 4,975,039 patent is able to produce twice as many patties per cycle as machines with only one row of cavities. However, an attendant disadvantage is the cost and complexity of a machine having two separated fill stations.

U.S. Pat. No. 4,872,241 teaches a patty molding machine having a mold plate with two transverse rows of cavities. The cavities are elongated for handling a whole muscle meat product rather than a ground meat product. The cavities are staggered in the longitudinal direction to make the two rows. No cavity in either row is aligned longitudinally with any other cavity. Each cavity has its own individual fill slot. All the cavities are filled simultaneously at the fill station.

U.S. Pat. No. 4,338,702 depicts a mold plate with two rows of cavities. The cavities in one of the rows are used only as passages between the manifold and plug-forming cavities on the opposite side of the mold plate as the manifold. Only the cavities in the other row receive meat product for making patties, and only the patties in that row of cavities are knocked out at the knockout station.

In spite of the numerous designs of patty producing machines available, there is room for further developments to them.

SUMMARY OF THE INVENTION

In accordance with the present invention, a double row molding apparatus is provided that greatly increases the productivity of food patty machines. This is accomplished by apparatus that includes a mold plate having pairs of longitudinally aligned cavities and a knockout mechanism that ejects food product from all the cavities simultaneously.

Each pair of mold plate cavities has a front cavity and a back cavity. The front cavities of the pairs are aligned in a front transverse row, and the back cavities of the pairs are aligned in a back transverse row.

The mold plate has a top surface that is in flat facing contact with a breather plate. A bottom surface of the mold plate is in flat facing contact with a top plate and with a filler plate that is installed into the top plate. A drive mechanism reciprocates the mold plate in longitudinal directions between a retracted position and an extended position. At the retracted position, the mold plate cavities are between the breather plate and the filler plate. Food product is forced from a manifold through fill slots in the filler plate into the mold plate cavities. At the extended position, the cavities overhang the breather plate and the top plate, and the cavities are open at both top and bottom surfaces of the mold plate. The knockout mechanism ejects food patties from all the cavities simultaneously. The mold plate then retracts back to the retracted position for refilling the cavities, and the cycle continues. Thus, for each cycle, twice as many patties are produced as was possible using the prior machines that had a single row of cavities.

According to one aspect of the invention, there is a single long fill slot in the filler plate. The row of front cavities is in communication with the fill slot, but the back cavities are not in communication with the fill slot when the mold plate is at its retracted position. Rather, the row of back cavities are sealed from the fill slot by the close fit of the mold plate top and bottom surfaces with the breather plate and the top plate, respectively. Preferably, the fill slot is closer to the trailing edges of the mold plate front cavities than to the leading edges of the cavities. Food product is forced from the manifold through the fill slot only to the front cavities when the mold plate is at its retracted position.

The mold plate then advances toward its extended position. After only a short advancement, the front mold plate cavities lose communication with the fill slot. On the other hand, the advancing mold plate causes the back cavities to pass over the fill slot. As the back cavities pass over the fill slot, the food product, under pressure, flows through the fill slot into the back cavities. The flow of the food product into the back cavities completely fills them, which may have been partially filled previously, as will be explained shortly. When the mold plate is at its extended position, the back cavities have completely passed the fill slot, and the fill slot is sealed off from all the cavities. The knockout mechanism operates to eject the food product simultaneously from all the cavities.

During the mold plate return stroke, the back cavities again pass over the fill slot. Any residual pressure on the food product in the manifold will cause the food product to flow through the fill slot into the back cavities and partially fill them. At the end of the return stroke, when the mold plate is again at its retracted position, the front cavities are again over the fill slot, and the back cavities are sealed off from the fill slot. The mold plate dwells momentarily at the retracted position, during which time the front cavities are filled. The mold plate then advances forward. As they pass over the fill slot, the back cavities are completely filled, and the cycle repeats. It is thus seen that the back cavities fill with the food product during both forward and return strokes, but not during the mold plate dwell at the end of the return stroke. On the other hand, the front cavities fill only during the dwell at the end of the return stroke and not during either the forward or return strokes. Rather than one long fill slot that communicates with all the mold plate cavities, the filler plate may have multiple short fill slots each associated with a respective pair of front and back cavities.

In another embodiment of the invention, there are single long front and back fill slots. The front fill slot communicates with the row of front mold plate cavities when the mold plate is at its retracted position, and the back fill port communicates with the row of back cavities. The front fill slot may be close to the trailing edges of the mold plate front cavities, and the back fill slot may be close to the leading edges of the back cavities. During the dwell of the mold plate at the retracted position, food product flows from the manifold through the two fill slots into all the cavities simultaneously. During the forward stroke of the mold plate, the front cavities quickly lose communication with the front fill slot. On the other hand, the back cavities of the mold plate pass over and temporarily communicate with the front fill slot. Any residual pressure of the food product tends to force it through the front fill slot into the back mold plate cavities. Consequently, the back mold plate cavities are fillable from both the back and front fill slots. When the mold plate has advanced to its extended position, the knockout mechanism ejects the food patties from all the cavities simultaneously.

During the mold plate return stroke, the back cavities pass over the front fill slot. Any residual pressure on the food product causes it to flow through the front fill slot into the back cavities. The back cavities can thus be partially filled during the mold plate return stroke. When the mold plate has returned to its retracted position, it dwells there momentarily while the food product flows through the front and back fill slots into the front and back cavities, respectively. Because the front cavities fill only during the dwell time, whereas the back cavities fill both during the dwell time and during the forward and return strokes of the mold plate, the front fill slot preferably has a larger cross-sectional area than the back fill slot.

If desired, the front fill slot that communicates with all the front cavities can be several short fill slots each in communication with a respective front cavity when the mold plate is at its retracted position. Similarly, several short back fill slots can be used instead of one long back fill slot.

To eject the food patties from the mold plate, the knockout mechanism of the invention has two rows of knockout cups on a single knockout bar. The knockout bar is attached to a pair of knockout slides that are guided for vertical reciprocation in respective guides. Each of a pair of knockout arms has a first end that engages a respective knockout slide. Each knockout arm is pivotally connected between its ends to a housing that is part of the double row molding apparatus. Inside the housing is a shaft with a pair of cams. The cams are in contact with second ends of the knockout arms. The shaft and cams rotate in timed relation to the reciprocation of the mold plate. For all positions of the mold plate except its extended position, the cams hold the knockout cups against a spring force away from the mold plate. When the mold plate is at its extended position, the cams allow the spring force to reciprocate the knockout cups to if eject all the patties from the mold plate simultaneously.

The method and apparatus of the invention, using double rows of longitudinally aligned cavities in a mold plate, thus improves productivity of a meat patty machine. The probability of producing imperfect patties is remote, even though the back cavities are fillable on both forward and return strokes of the mold plate.

Other advantages, benefits, and features of the present invention will become apparent to those skilled in the art upon reading the detailed description of the invention.

BRIEF DESCRIPTION OF THE DRAWINGS

FIG. 11 is a simplified top view of the knockout mechanism of the present invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

General

Figure 1:
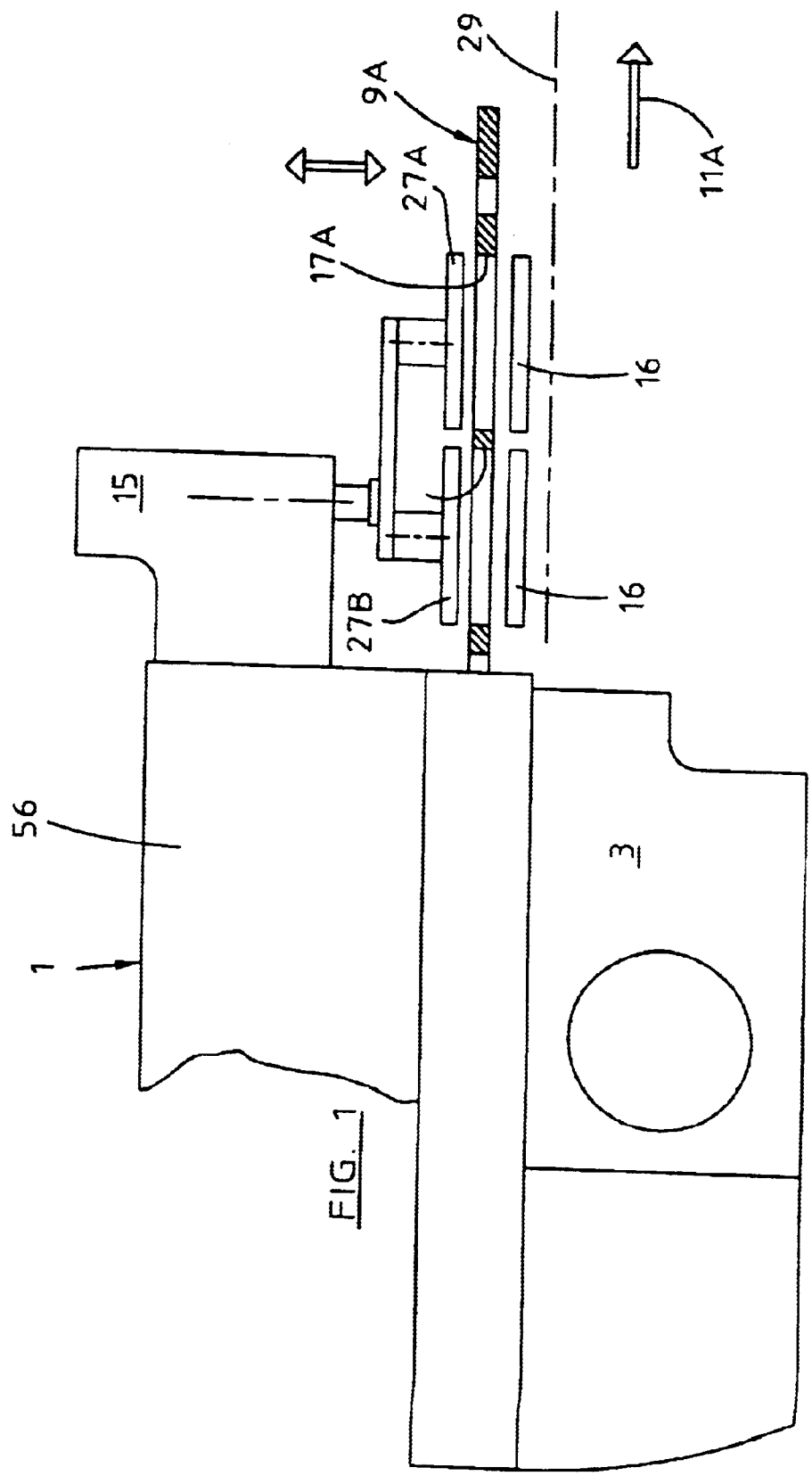
FIG. 1 is a broken partial front view of a food patty machine that includes the double row molding apparatus of the invention and showing the mold plate at its extended position.
Figure 2:
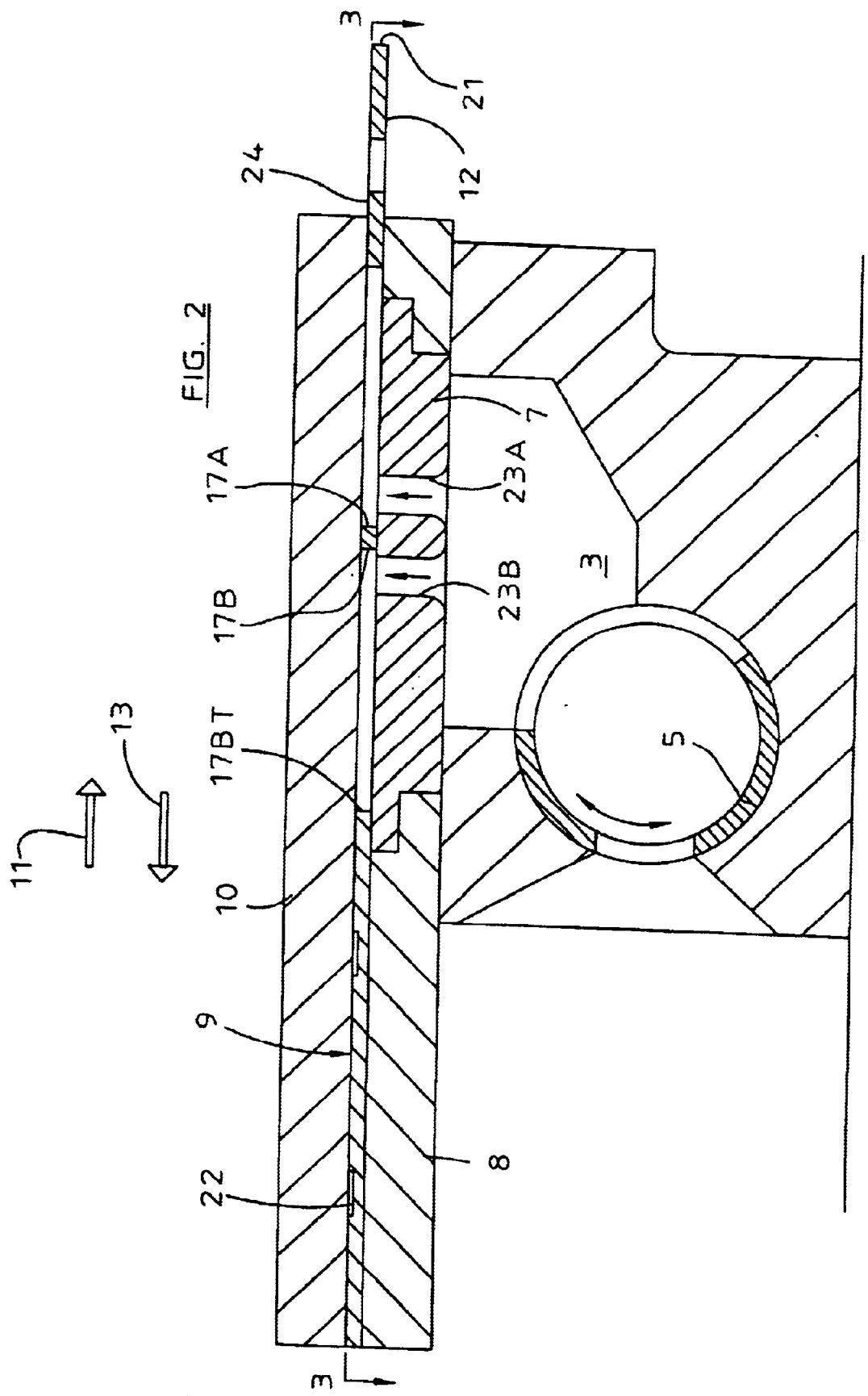
FIG. 2 is a longitudinal cross-sectional view on an enlarged scale of a portion of the double row molding apparatus of the invention showing the mold plate in its retracted position.

Referring first to FIGS. 1 and 2, a portion of a food patty molding machine 1 is illustrated that includes the present invention. A typical prior food patty molding machine is manufactured by Formax, Inc. of Mokena, Ill. However, the particular food patty machine 1 is not critical to the invention.

Briefly by way of background, the food patty molding machine 1 includes a large hopper, not illustrated in the drawings, that contains a quantity of a food product such as ground meat. The food product is pushed by well known means through a pump box (not shown) toward a manifold 3. A rotary valve 5 at the entrance of the manifold 3 either enables or prevents the food product from entering the manifold. From the manifold, the food product is forced through a filler plate 7 into a mold plate 9 that has a bottom surface 12 and a top surface 24. The filler plate 7 is installed in a top plate 8. The mold plate 9 is assembled between the filler plate 7 and top plate 8, and a breather plate 10. The mold plate reciprocates in longitudinal directions, as shown by arrows 11 and 13, between extended and retracted positions. A knockout mechanism 15 ejects patties 16 of the food product from the mold plate when the mold plate is at its extended position, as is shown at reference numeral 9A in FIG. 1.

First Embodiment

Figure 3:
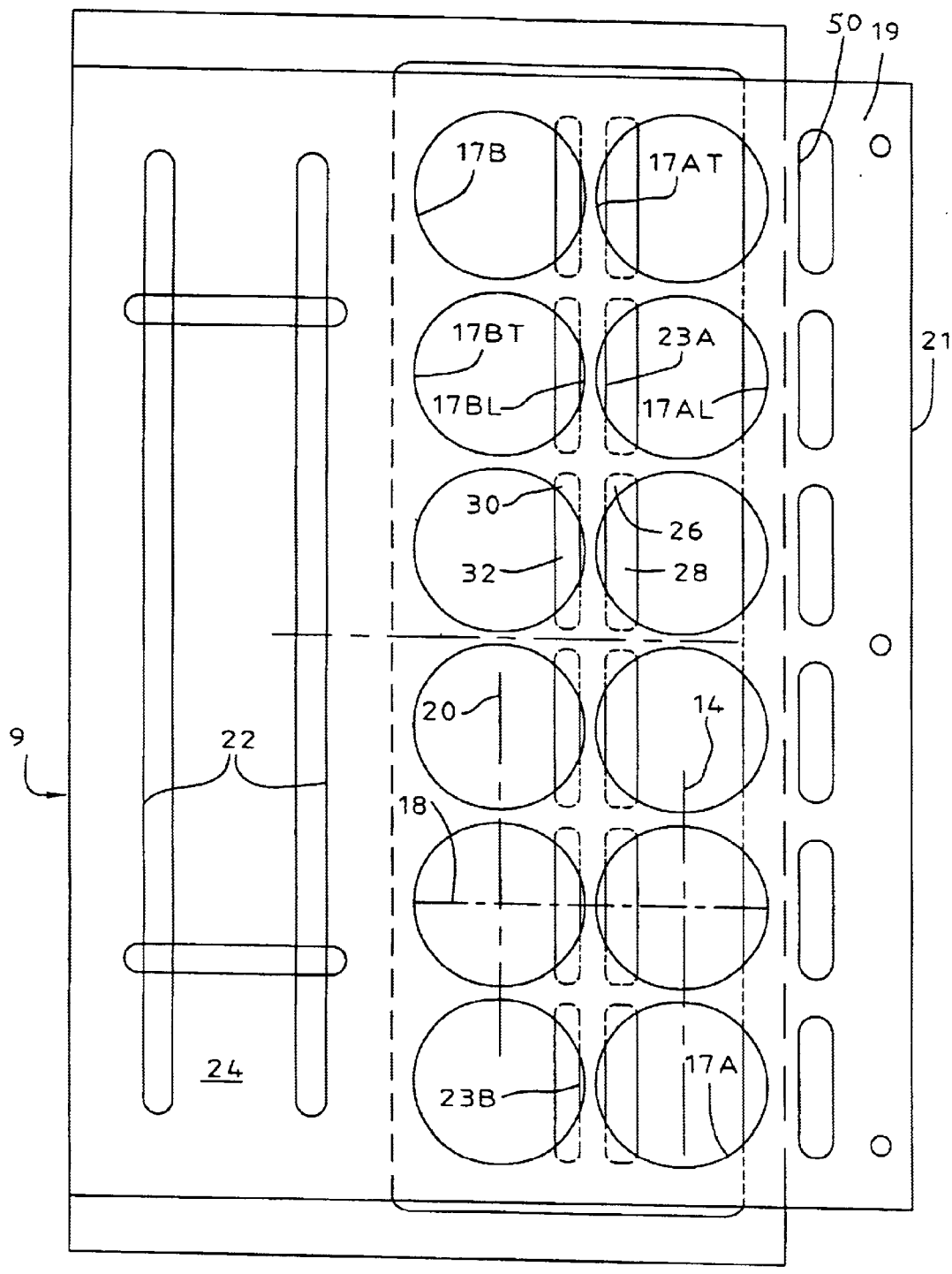
FIG. 3 is a view taken along line 3—3 of FIG. 2.
Figure 4:
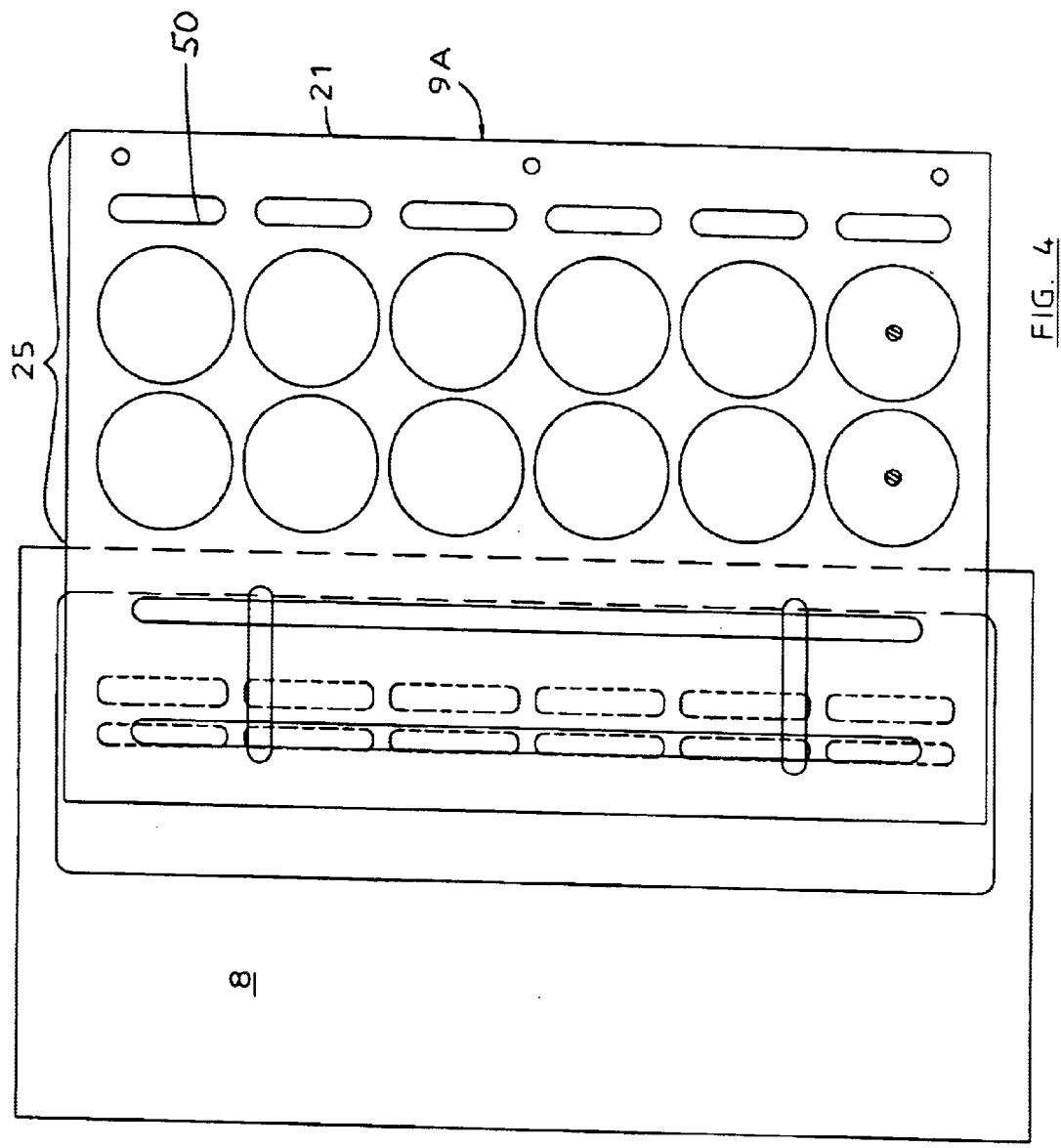
FIG. 4 is a view similar to FIG. 3, but showing the mold plate at its extended position.

In accordance with the present invention, and also looking at FIGS. 3 and 4, the mold plate 9 is constructed with rows of front and back cavities 17A and 17B, respectively, that receive the food product from the filler plate 7. The front cavities 17A are aligned along a front transverse centerline 14. The back cavities 17B are aligned along a back transverse centerline 20. The rows of cavities are arranged into pairs of one front cavity and one back cavity. The cavities of each pair are aligned along respective longitudinal centerlines 18.

The cavities 17A and 17B are shown as being circular in shape. However, oval and other shapes are also within the scope of the present invention. Each cavity 17A has a leading edge 17AL and a trailing edge 17AT. Similarly, each back cavity 17B has a leading edge 17BL and a trailing edge 17BT. The row of front cavities is next to a front section 19 of the mold plate 9. The mold plate front section 19 terminates in a front edge 21. The mold plate has openings, which may be in the form of slots 50, next to the front edge 21. The slots 50 receive pins from below the mold plate that are part of a linkage mechanism that reciprocates the mold plate in the longitudinal directions 11 and 13. There are shallow grooves 22 in the mold plate top surface 24 between the back cavities and the back edge of the mold plate. The grooves 22 fill with fluid during operation of the patty molding machine and aid in lubricating the mold plate.

In the particular construction shown in FIGS. 2–4, the filler plate 7 has a front row of fill slots 23A and a back row of fill slots 23B through it. Both rows of fill slots 23A and 23B open into the manifold 3. Preferably, the fill slots 23A of the front row are transversely aligned with each other, and the fill slots 23B of the back row are transversely aligned with each other. The fill slots illustrated have respective lengths in the transverse direction that are generally equal to the diameters of the mold plate cavities 17A and 17B. However, the fill slots may have other lengths, if desired. The fill slots 23A of the front row have a larger cross-sectional area than the fill slots 23B of the back row.

In FIGS. 2 and 3, the mold plate 9 is shown at its retracted position. In that situation, the cavities 17A of the front row are over associated fill slots 23A and the mold plate back cavities 17B are over the back fill slots 23B. According to one aspect of the invention, the fill slots 23A are closer to the trailing edges 17AT of the front cavities 17A than to their leading edges 17AL when the mold plate is at its retracted position, and the back fill slots 23B are closer to the leading edges 17BL of the back fill slots 17B than to their trailing edges 17BT. As mentioned, the lengths of the fill slots in the transverse direction in the particular construction shown are approximately equal to the diameter of the mold plate cavities. Consequently, there is an overlap portion 26 and a communicating portion 28 of each front fill slot 23A when the mold plate is at its retracted position. Similarly, there is an overlap portion 30 and a communicating portion 32 of each back fill slot 23B.

While the mold plate 9 is at its retracted position, the food product in the manifold 3 is forced through the fill slots 23A and 23B into the mold plate cavities 17A and 17B, respectively. When the cavities are filled with the product, the mold plate advances in the direction of arrow 11 toward its extended position, as shown at reference numeral 9A in FIGS. 1 and 4. It will be noticed that after a short advancement of the mold plate, the front cavities 17A lose communication with the fill slots 23A. Consequently, it is vital that the fill slots 23A have sufficient cross-sectional area to completely fill the cavities 17A before the mold plate forward stroke begins.

On the other hand, advancement of the mold plate 9 in the forward stroke 11 does not result in immediate loss of communication of the back cavities 17B with the associated fill slots 23B. Rather, the back cavities 17B remain in communication with the respective fill slots 23B until the trailing edges 17BT of the cavities have passed the back fill slots. Consequently, a smaller cross-sectional area for the back fill slots 23B is sufficient to enable the back cavities to completely fill. Moreover, the back cavities pass over the front fill slots 23A during the forward stroke of the mold plate. Any residual pressure of the food product in the manifold 3 causes the food product to flow through the front fill slots into the back cavities and thus further assures that the back cavities are completely filled before they pass completely past the front fill slots.

When the mold plate is at its extended position 9A, the section 25 of the mold plate overhangs the top plate 8 and the breather plate 10. The knockout mechanism 15 ejects the food patties 16 from the two rows of cavities 17A and 17B simultaneously when the mold plate is at its extended position. For that purpose, the knockout mechanism comprises a front row of knockout cups 27A and a back row of knockout cups 27B. The knockout cups 27A and 27B align with the mold plate cavities 17A and 17B, respectively, when the mold plate is at its extended position. The patties fall by gravity onto a conveyor or similar transfer device, schematically represented by reference numeral 29, that conveys them in a downstream direction 11A for further processing.

As soon as the knockout mechanism 15 has ejected the patties 16 from the mold plate 9, the mold plate begins its return stroke, arrow 13. As the back mold plate cavities 17B pass over the front fill slots 23A, any residual pressure on the food product in the manifold 3 causes a small amount of the product to flow through the front fill slots into the respective back cavities. Similarly, any residual product pressure also causes the product to flow through the back fill slots 23B into the respective back mold plate cavities 17B. No product flows from the front fill slots 23A into the front cavities 17A until the mold plate is almost fully at its retracted position. During a short dwell of the mold plate at its retracted position, the rotary valve 5 in the manifold operates to enable full force to be applied to the food product. A full charge flows through the front fill slots into the front mold plate cavities 17A. Simultaneously, food product flows through the back fill slots into the back mold plate cavities.

When the front mold plate cavities are filled, the mold plate again advances in the forward stroke, arrow 11, and the cycle is complete. It is thus seen that for each cycle, twice as many patties 16 are produced by means of the present invention than were produced by prior equipment that also had but a single fill station.

Figure 9:
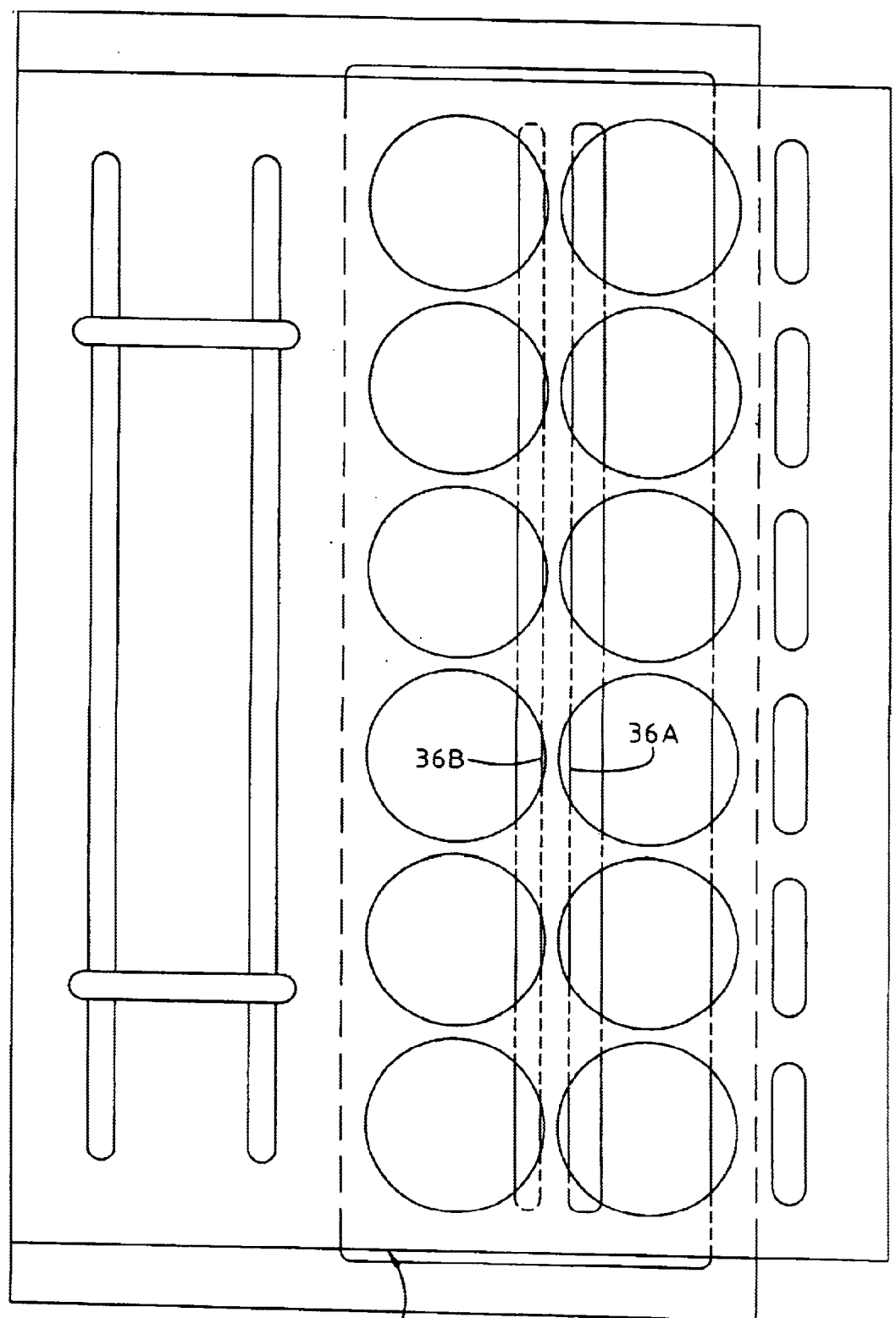
FIG. 9 is a view generally similar to FIG. 3, but showing single long front and back fill slots.

Turning to FIG. 9, a filler plate 45 may be used that has a single long front fill slot 36A and a single long back fill slot 36B. The single long fill slots 36A and 36B function essentially the same as the multiple short fill slots 23A and 23B, respectively, of the filler plate 7 described previously in conjunction with FIGS. 2–4. The single front fill slot 36A has a larger cross-sectional area than the single back fill slot 36B.

Second Embodiment

Further in accordance with the present invention, two rows of cavities in a mold plate are supplied by a single row of transversely aligned fill slots. FIGS. 5–8 show a food patty machine 31 having a manifold 3' with a rotary valve 5'. A filler plate 33 is installed in a top plate 8'. The filler plate 33 has a single row of multiple fill slots 34. A breather plate 10' is on the opposite surface of a mold plate 35 as the filler plate and the top plate 8'. The mold plate 35 reciprocates in forward strokes 11' and return strokes 13'.

In the mold plate 35 are a row of front cavities 37A and a row of back cavities 37B. The cavities 37A and 37B are shown as ovular in shape, but round or other shapes are also acceptable. Each cavity 37A has a leading edge 37AL and a trailing edge 37AT. Each back cavity 37B has a leading edge 37BL and a trailing edge 37BT. The cavities are arranged in longitudinally aligned pairs. Each pair of cavities is longitudinally aligned with a respective fill slot 34.

Figure 5:
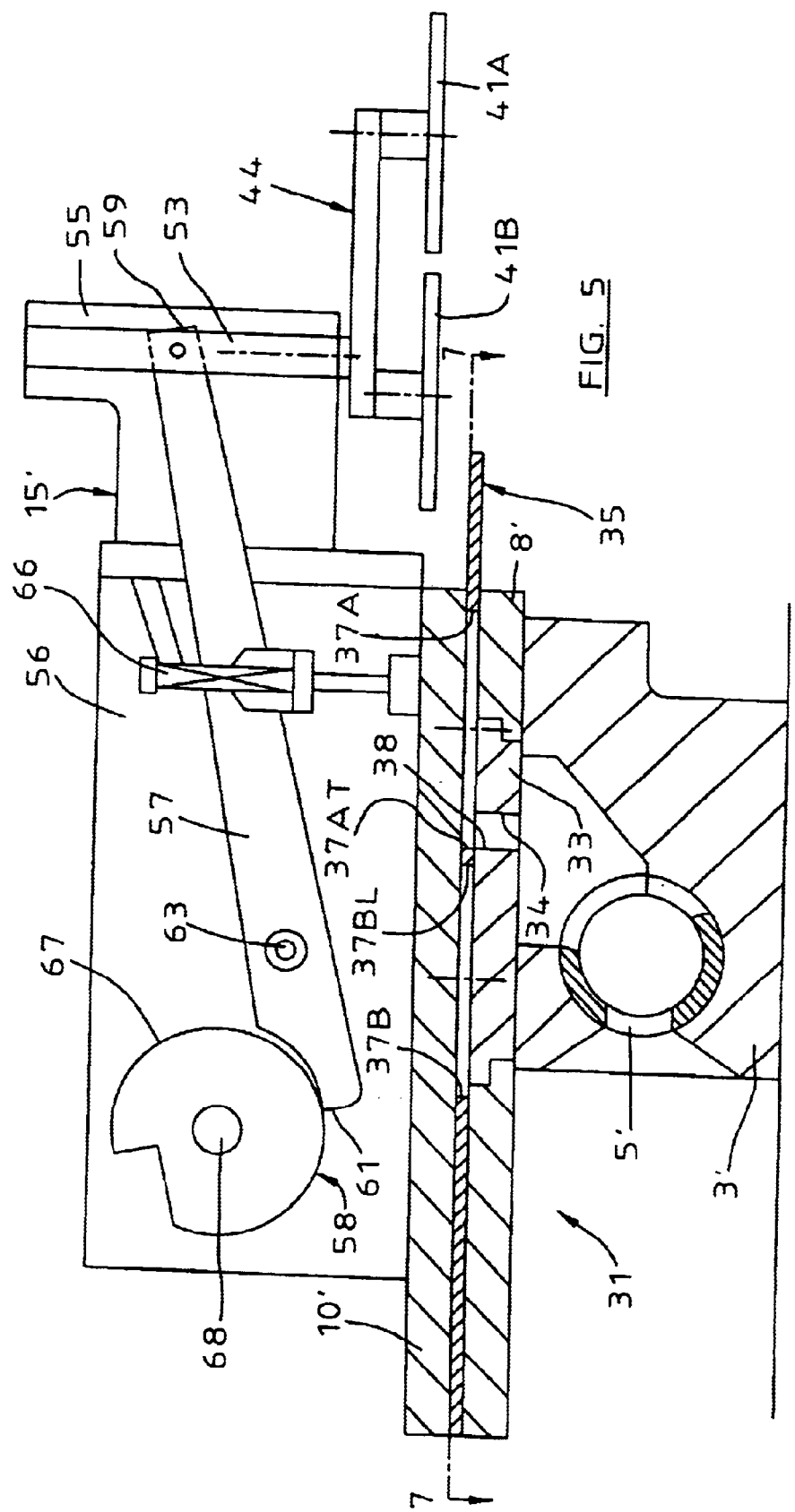
FIG. 5 is a simplified longitudinal cross-sectional view of a modified embodiment of the invention showing the mold plate at its retracted position.
Figure 6:
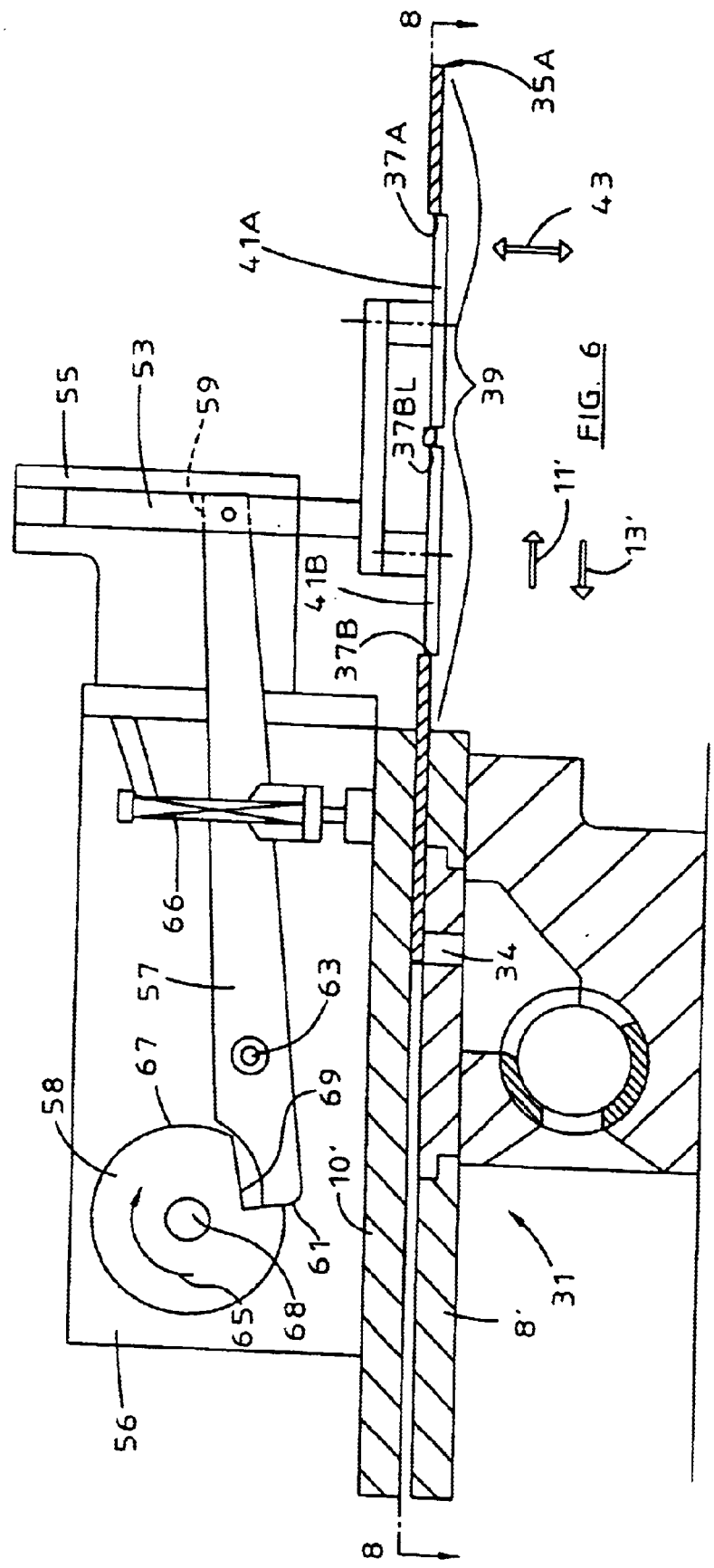
FIG. 6 is a view similar to FIG. 5, but showing the mold plate at its extended position.
Figure 7:
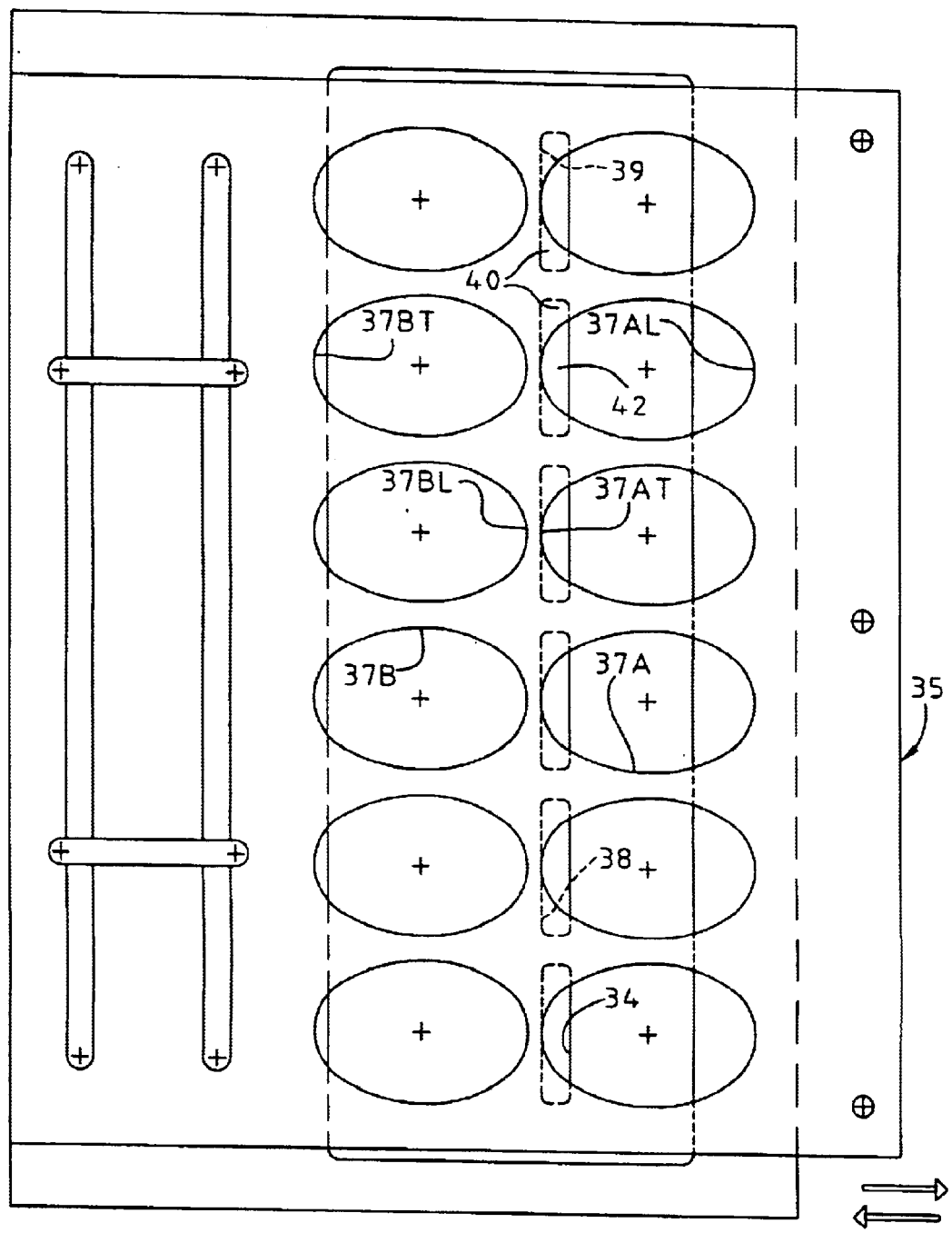
FIG. 7 is a view taken along line 7—7 of FIG. 5.
Figure 8:
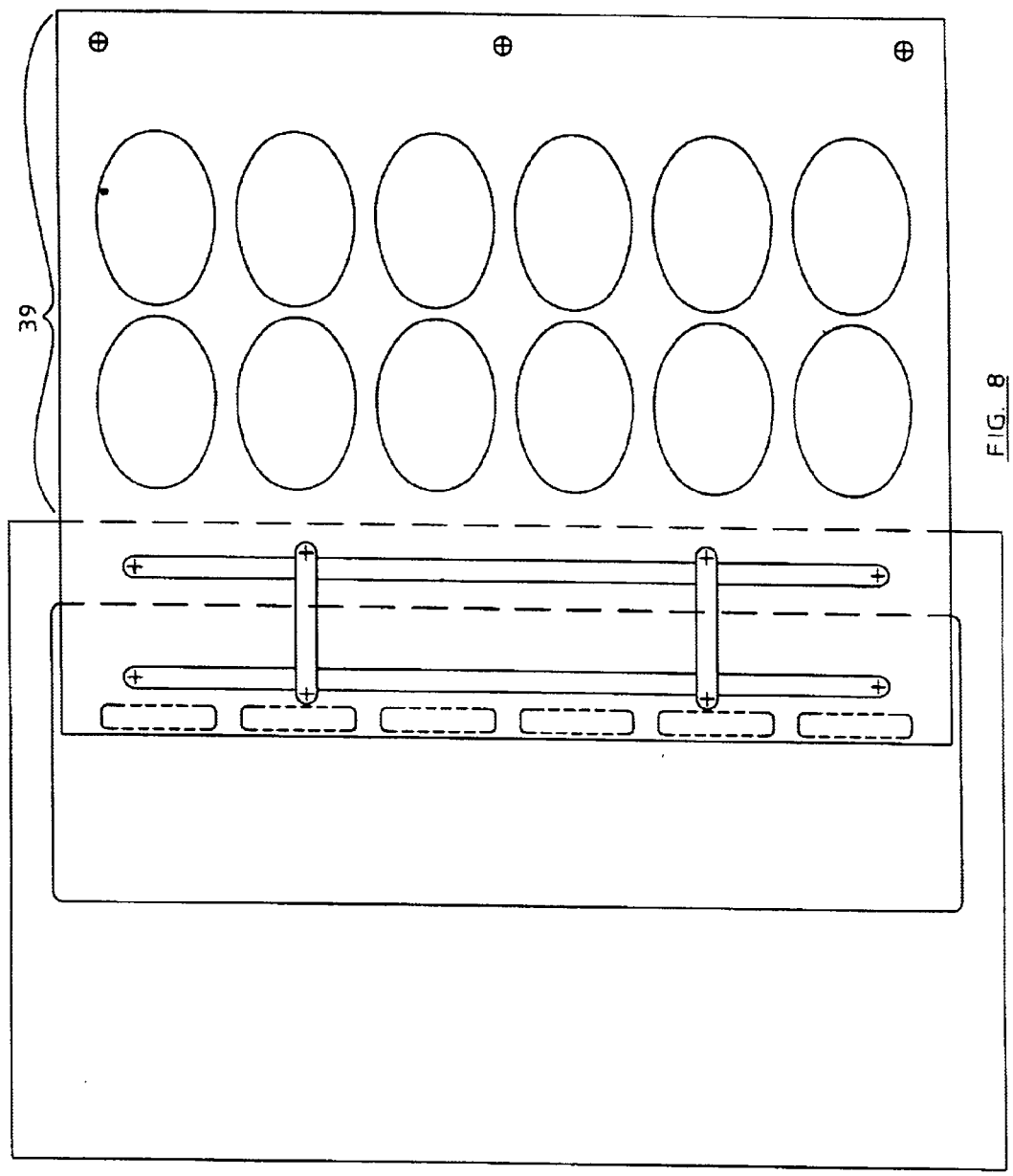
FIG. 8 is a view taken along line 8—8 of FIG. 6.

FIGS. 5 and 7 show the mold plate 35 in its retracted position. In that situation, the row of back cavities 37B are completely sealed off from the manifold 3'. The row of front cavities 37A are in communication with the respective fill slots 34. In the preferred embodiment, the back surfaces 38 of the fill slots are vertically aligned with the trailing edges 37AT of the respective cavities 37A when the mold plate is at its retracted position. Accordingly, there is a portion 40 on the ends of each fill slot that is overlapped by the mold plate, thus leaving a center portion 42 in communication with the respective cavities.

When the mold plate is at its retracted position, the rotary valve 5' opens to cause food product in the manifold 3' to flow through the fill slots 34 into the respective front cavities 37A. After a dwell time sufficient to fill the front cavities 37A, the mold plate 35 advances in its forward stroke, arrow 11', toward its extended position 35A, FIGS. 6 and 8. As the back cavities 37B pass over the respective fill slots 34, food product is forced into the back cavities. The food product is able to flow into the back cavities for the full time those cavities are over the respective fill slots. As a result, the back cavities are completely filled by the time they have passed the fill slots. At the extended position 35A of the mold plate, section 39 thereof overhangs the top plate 8' and the breather plate 10'.

A knockout mechanism 15' has front and back rows of knockout cups 41A and 41B, respectively, that align with the front and back cavities 37A and 37B, respectively, when the mold plate is at its extended position 35A. The knockout mechanism 15' reciprocates the knockout cups 41A and 41B in the directions of arrows 43 to eject patties from all the mold plate cavities simultaneously.

The mold plate 35 then retracts in its return stroke, arrow 13'. Any residual pressure on the food product in the manifold 3' and fill slots 34 will cause the product to flow into the mold plate back cavities 37B during the return stroke. When the mold plate is fully at its retracted position, FIGS. 5 and 7, it dwells there long enough to completely fill the front cavities 37A, and the cycle is complete.

Figure 10:
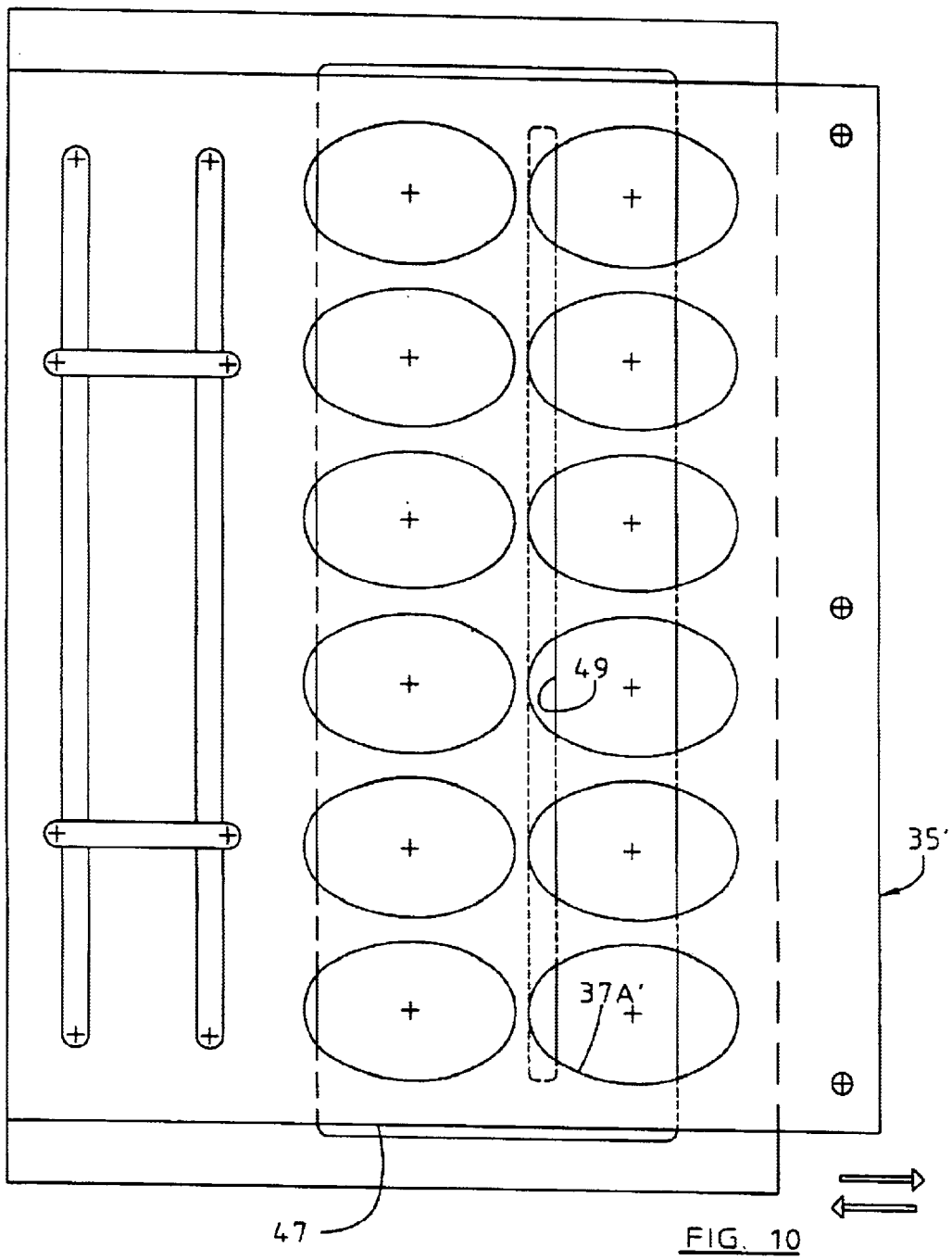
FIG. 10 is a view generally similar to FIG. 7, but showing a single long fill slot.

In an alternate embodiment, a single long fill slot can be used instead of a row of multiple fill slots. In FIG. 10, a filler plate 47 has a single long fill slot 49. The fill slot 49 communicates with all the row of front cavities 37A' when the mold plate 35' is at its retracted position. The single long fill slot 49 functions in the same fashion as the row of multiple short fill slots 34 described above in connection with FIGS. 5–8.

Knockout Mechanism

The knockout mechanisms 15 and 15' constitute an important part of the present invention. The knockout mechanism 15' will be described in conjunction with the food patty machine 31 and mold plate 35. However, it will be appreciated that the knockout mechanism 15 used with the machine 1 and mold plate 9 is substantially similar to the knockout mechanism 15'.

The knockout mechanism 15' comprises a knockout bar 44 that holds all the knockout cups 41A and 41B. As best seen in FIG. 11, the knockout bar 44 has a main transverse strip 46 and a number of longitudinal projections 48. A pair of front and back knockout cups is held to each longitudinal projection 48, as by conventional fasteners 51.

The knockout bar 44 is reciprocated in the directions of arrows 43 by a pair of knockout slides 53. The knockout slides 53 are guided in respective guides 55 that are attached to a mold cover 56 that is part of the machine 31. To reciprocate the knockout slides and knockout bar, the knockout mechanism 15' further comprises a knockout arm 57 and a cam 58 in operative association with each knockout slide. Each knockout arm 57 has a first end 59 that engages the associated knockout slide, as, for example, by fitting into a slot in the knockout slide and being pinned to the knockout slide. The knockout arm second end 61 contacts the associated cam 58. Between the ends 59 and 61 of each knockout arm is a pivot 63 with the housing 56. A spring 66 between the pivot 63 and first end biases the knockout arm in a clockwise direction with respect to FIG. 5. The cam 58 has a single lobe 67.

The cams 58 are connected to a common shaft 68. The shaft 68 rotates at a constant speed in the direction of arrow 65 8 in timed relation with the reciprocation of the mold plate 35. The timing is such that the knockout-cups 41A and 41B are away from the mold plate for all parts of the mold plate cycle except when the mold plate is at its extended position. When the mold plate is at its extended position, the cam orientation is such that the knockout arms second ends 61 enter the depressions 69 on the ends of the cam lobes 67. The springs 66 force the knockout arms clockwise with respect to FIG. 5 such that the knockout cups contact the patties in the mold plate cavities 37A and 37B and eject the patties from the mold plate. Continued rotation of the shaft causes the cam lobes to pivot the knockout arms in the reverse direction and reciprocate the knockout cups away from the mold plate, and the cycle repeats.

Summary

In summary, the results and advantages of food patty machines can now be more fully realized. The double row molding apparatus of the invention provides greatly increased production of food patties from a generally convention molding machine. This desirable result comes from using the combined functions of the double rows of cavities in the mold plate and the two rows of multiple fill slots 23A and 23B in the filler plate 7. The front and back cavities are filled simultaneously during a short dwell of the mold plate at its retracted position. In addition, food product is able to flow into the back cavities from the front fill slots as the mold plate advances toward its extended position. Food patties are ejected from all the cavities simultaneously when the mold plate is at its extended position. If desired, single long fill slots 36A and 36B can be used in place of the multiple fill slots 23A and 23B, respectively. In a modified embodiment, a single row of multiple fill slots 34 supplies both the front and back mold plate cavities. The front cavities are filled during the dwell of the mold plate at its retracted position. The back cavities are filled as they pass over the fill slots 34 during the mold plate advance stroke. The back cavities may be partially filled as they pass over the fill slots 34 during the mold plate return stroke. A long single fill slot 49 may be used instead of the multiple fill slots 34.

It will also be recognized that in addition to the superior performance of the double row molding apparatus of the invention, its construction is such to be of modest cost when compared to the benefits it provides. In fact, an investment in the present invention quickly pays for itself because of the greatly increased production available from a food patty molding machine.

Thus, it is apparent that there has been provided, in accordance with the invention, a double row molding apparatus that satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A method of making food patties comprising the steps of:
    a. reciprocating a mold plate in a return stroke to a retracted position;
    b. flowing a first quantity of a food product from a manifold into only a row of front cavities in the mold plate when the mold plate is at the retracted position thereof;
    c. advancing the mold plate in a forward stroke to an extended position;
    d. flowing a second quantity of the food product from the manifold into a row of back cavities in the mold plate during the forward stroke; and
    e. simultaneously ejecting the food product from all the cavities simultaneously when the mold plate is at the extended position thereof.

2. The method of claim 1 wherein:
    a. the step of flowing a first quantity of a food product comprises the step of flowing a first quantity of the food product through a single fill slot that communicates only with all the front cavities when the mold plate is at the retracted position thereof; and
    b. the step of flowing a second quantity of a food product comprises the step of flowing a second quantity of the food product through the fill slot to all the back cavities during the mold plate forward stroke.

3. The method of claim 1 wherein the step of flowing a first quantity of a food product comprises the steps of:
    a. flowing a first quantity of the food production in a first direction out of the manifold; and
    b. flowing the food product in the first direction into the row of front mold plate cavities.

4. The method of claim 1 wherein the step of flowing a first quantity of a food product comprises the step of flowing a first quantity of a food product through multiple fill slots simultaneously to all the front mold plate cavities and simultaneously blocking any flow of the food product to the row of back mold plate cavities when the mold plate is at the retracted position thereof.

5. The method of claim 1 comprising the further steps of:
    a. reciprocating the mold plate in a return stroke from the extended position toward the retracted position thereof; and
    b. flowing a third quantity of the food product from the manifold sequentially firstly into only the row of back cavities and secondly into only the row of front cavities during the mold plate return stroke.

6. The method of claim 4 comprising the further steps of:
    a. reciprocating the mold plate in a return stroke from the extended position toward the retracted position thereof; and
    b. flowing a third quantity of the food product from the manifold through multiple fill slots sequentially firstly into only the row of back cavities and secondly into only the row of front cavities during the mold plate return stroke.

7. The method of claim 2 comprising the further steps of:
    a. reciprocating the mold plate in a return stroke from the extended position thereof to the retracted position thereof; and
    b. flowing a third quantity of the food product through the fill slot into the back cavities and simultaneously blocking any flow of the third quantity of the food product through the fill slot into the front cavities during the mold plate return stroke.

8. A method of producing food patties comprising the steps of:
    a. providing a mold plate that defines a plurality of rows of transversely spaced and longitudinally aligned cavities each having a trailing edge and a leading edge;
    b. providing a fill plate having a number of rows of transversely aligned fill slots equal to the number of the rows of mold plate cavities;
    c. reciprocating the mold plate in a return stroke to a fill position;
    d. aligning the rows of mold plate cavities with the respective rows of fill plate fill slots;
    e. flowing a food product out of a manifold in a first direction;
    f. flowing the food product in the first direction simultaneously through the fill slots;
    g. flowing the food product in the first direction simultaneously into the respective rows of mold plate cavities;
    h. advancing the mold plate in a forward stroke to an extended position; and
    i. simultaneously ejecting food product patties from all the mold plate cavities.

9. The method of claim 8 wherein:
    a. the step of providing a mold plate comprises the step of providing the mold plate with a row of front cavities and with a row of back cavities;
    b. the step of providing a fill plate comprises the step of providing a fill plate with a single front fill slot and with a single back fill slot; and
    c. the step of flowing a food product comprises the steps of:
        i. flowing the food product through the front fill slot into the row of mold plate front cavities at locations closer to the respective trailing edges than to the leading edges thereof; and ii. flowing the food product through the back-fill slot into the row of mold plate back cavities at locations closer to the respective leading edges than to the trailing edges thereof.

10. The method of claim 8 wherein:

a. the step of providing a mold plate comprises the step of providing the mold plate with a row of front cavities and with a row of back cavities; and b. the step of providing a fill plate comprises the step of providing a fill plate with a front fill slot having a first cross-sectional area, and with a back fill slot having a second cross-sectional area less than the first cross-sectional area.

11. A method of producing food patties comprising the steps of:

a. providing a mold plate that defines multiple rows of transversely and longitudinally aligned cavities including a row of front cavities and a row of back cavities, each cavity have a leading edge and a trailing edge;

b. reciprocating the mold plate to a retracted position;

c. flowing food product into the row of mold plate front cavities at locations closer to the respective trailing edges than to the respective leading edges thereof, and simultaneously flowing food product into the row of mold plate back cavities at locations closer to the respective leading edges than to the tespective trailing edges thereof;

d. reciprocating the mold plate to an extended position; and e. simultaneously ejecting food product patties from all the mold plate cavities.

12. The method of claim 11 wherein the step of flowing food product comprises the steps of:

a. flowing food product in a first direction out of a manifold; and b. flowing food product in the first direction through multiple front fill slots into the row of mold plate front cavities, and simultaneously flowing food product in the first direction through multiple back fill slots into the row of mold plate back cavities.

13. The method of claim 11 wherein the step of flowing food product comprises the steps of:

a. flowing food product in a first direction out of a manifold; and b. flowing food product in the first direction through a single front fill slot into the row of mold plate front cavities, and simultaneously flowing food product in the first direction through a single back fill slot into the row of mold plate back cavities.

14. The method of claim 11 wherein the step of flowing food product comprises the steps of flowing the food product into the row of mold plate front cavities through respective front fill slots each having a first cross-sectional area, and simultaneously flowing the food product into the row of mold plate back cavities through respective back fill slots each having a cross-sectional area less than the first cross-sectional area.

15. The method of claim 11 wherein the step of flowing food product comprises the steps of flowing the food product into the row of mold plate front cavities through a single front fill slot having a first cross-sectional area, and simultaneously flowing the food product into the row of mold plate back cavities through a single back fill slot having a cross-sectional area less than the first cross-sectional area.

* * * * *